US005628374A

United States Patent [19]

Dibbern, Jr.

[11] Patent Number: 5,628,374

[45] Date of Patent: May 13, 1997

[54] HAMMER DRILL WITH INCLINED CLUTCH PLATE

[75] Inventor: John E. Dibbern, Jr., Street, Md.

[73] Assignee: Black & Decker Inc., Newark, Del.

[21] Appl. No.: 312,337

[22] Filed: Sep. 26, 1994

[51] Int. Cl.[6] .......... B23B 45/16; B25D 16/00

[52] U.S. Cl. .......... 173/48; 173/104; 173/217

[58] Field of Search .......... 173/13, 47, 48, 173/104, 109, 217, 170; 192/108, 11 R; 81/475, 476

[56] References Cited

U.S. PATENT DOCUMENTS

| | | | |
|---|---|---|---|
| 3,799,275 | 3/1974 | Plattenhardt et al. | 173/48 X |
| 4,223,744 | 9/1980 | Lovingood | 173/48 |
| 4,479,555 | 10/1984 | Grossmann et al. | 173/48 X |

FOREIGN PATENT DOCUMENTS

| | | |
|---|---|---|
| 0613758 | 9/1994 | European Pat. Off. . |
| 4215421 | 11/1992 | Germany . |
| 1352958 | 5/1974 | United Kingdom . |
| 2115337 | 9/1983 | United Kingdom . |

OTHER PUBLICATIONS

Black & Decker Power Tool & Accessories Catalog, Copyrighted 1985, p. 23, Model No. 7277.

*Primary Examiner*—Joseph J. Hail, III
*Assistant Examiner*—Jay A. Stelacone
*Attorney, Agent, or Firm*—Dennis A. Dearing; John D. Del Ponti; Charles E. Yocum

[57] ABSTRACT

A hammer drill may be set for operation in a hammer mode or a drill mode through a mode selector 41. In the drill mode, output shaft 25 is locked in a forwardly biased position and is rotatably driven through spur gears 29, 31. In the hammer drill mode, output spindle 25 is rotatably driven by spur gears 29, 31 and is axially reciprocated by hammer clutch 55. An output clutch plate 57 of clutch 55 is axially and rotatably fixed to spindle 25 and has a first annular tooth array 63 on rear face 61. An input clutch plate 59 of clutch 55 is axially and nonrotatably fixed in tool housing 15 and has a second annular tooth array 67 on a forwardly inclined front face 65. Tooth arrays 63, 67 are engageable in the hammer mode. Output clutch plate 57 is shiftable in use in the hammer mode to position the rear face 61 generally parallel to the front face 65. The forward inclination of input clutch front face 65 compensates for the movement of output clutch rear face 61 from a no-load to a load position so that the faces 65, 61 are generally parallel in use. By ensuring parallelism of the clutch faces 65, 61 in use, clutch 55 has a significantly improved life.

11 Claims, 5 Drawing Sheets

HAMMER DRILL WITH INCLINED CLUTCH PLATE

FIELD OF THE INVENTION

This invention relates to a hammer drill selectively operable in a hammer drill mode and a drill mode.

BACKGROUND OF THE INVENTION

Conventional hammer drills operate in two modes, namely, a hammer drill mode and a drill mode. In the hammer drill mode, a hammer bit is rotatably driven and axially reciprocated to drill holes in hard brittle materials such as a brick, mortar and concrete. In the drill mode, a drill bit is rotatably driven only to drill holes in softer less brittle materials such as wood and metal. To axially reciprocate and rotate the hammer bit in the hammer drill mode, the hammer drill contains a forwardly spring biased output spindle and a normally disengaged hammer clutch consisting of an input clutch plate and an output clutch plate. The plates have mutually opposed sets of teeth to axially reciprocate the spindle when the clutch is engaged. The output clutch plate is axially and rotatably fixed to the output spindle. The input clutch plate is axially and nonrotatably fixed in the housing and is engageable by the output clutch plate when an operator applies a rearward bias to the output spindle when engaging a hammer bit with a workpiece. When the output clutch plate is rotatably driven through a gear train, the output clutch plate is axially reciprocated by the ratcheting of the output clutch plate teeth over the fixed teeth of the input clutch plate. In the drill mode, the output spindle is locked in the forwardly spring biased position. And, the input and output clutch plates are fixed in a disengaged position regardless of the rearward biased applied to the output spindle by an operator. As the result, the output spindle is rotatably driven only.

Housings for such hammer drills are generally of two types. One type is a clam shell housing comprising two clam shell housing halves joined generally along an interface lying in a plane parallel to the axis of the output spindle. A second housing type is a jam pot housing comprising two housing halves joined along an interface lying generally in a plane perpendicular to the output spindle. For manufacture of a tool with a clam shell housing, the internal components are loaded into one clam shell half and then the second clam shell half is mounted over the components and first clam shell half. For manufacture of a tool with a jam pot housing, the components are end loaded into the front and rear housing portions which are generally barrel shaped. Then the two housing halves and the components assembled into each are attached together. Tools with a clam shell housing are generally considered to be lower in cost and easier to assemble than tools with a jam pot housing. Clam shell housings have, therefore, become widely used for high volume mass produced portable power tools.

In prior art clam shell hammer drills, it has been found that the durability of the hammering clutch is poor. And, it is therefore desirable to develop an improved, low cost hammer drill with a more durable hammer clutch.

SUMMARY OF THE INVENTION

The present invention is directed to a hammer drill comprising a forwardly spring biased output spindle rotatably driven by a motor and axially slidably mounted in the tool housing. A mode selector is engageable with the spindle for locking the spindle against the axial movement in the drill mode setting and is disengageable with the spindle for permitting the spindle to be axially slidable in the hammer mode setting. A hammer clutch includes first and second clutch plates. The first clutch plate is fixed to and rotatable with the output spindle and has a first tooth array on a rear face transverse to the spindle axis. The second clutch plate is fixed to the housing and has a second tooth array on a forwardly inclined front face opposed to the rear face of the first plate. The first and second tooth arrays are engageable in the hammer mode setting when an operator applied rearward bias is applied to the spindle when a drill bit is pushed against a workpiece. The rear face is shiftable in use in the hammer mode to be generally parallel to the front face.

The forward inclination of the front face of the second clutch plate compensates for the movement of the rear face from a no-load to a load position so that the faces of the two clutch plates may be generally parallel in use. If misaligned in use, the plates would only engage in a limited region of the tooth arrays and would wear excessively in this region. As a result of the present invention, the hammer clutch has a significantly improved life.

The front face is preferably inclined at about a 1° angle relative to a line perpendicular to the no-load spindle axis.

Preferably, the output spindle is rotatably driven through a first spur gear formed on the periphery of the first clutch plate.

For low cost and ease of assembly, the hammer drill preferably comprises two clam shell halves joined generally in a plane extending parallel to the spindle axis.

Additional objects and advantages of the invention will be apparent from the detailed description of the preferred embodiment, the appended claims and the accompanying drawings or may be learned by practice of the invention.

BRIEF DESCRIPTION OF THE DRAWINGS

The accompanying drawings which are incorporated in, and constitute a part of this specification illustrate an embodiment of the invention and together with the description, serve to explain the principles of the invention.

DESCRIPTION OF THE PREFERRED EMBODIMENT

Figure 1:
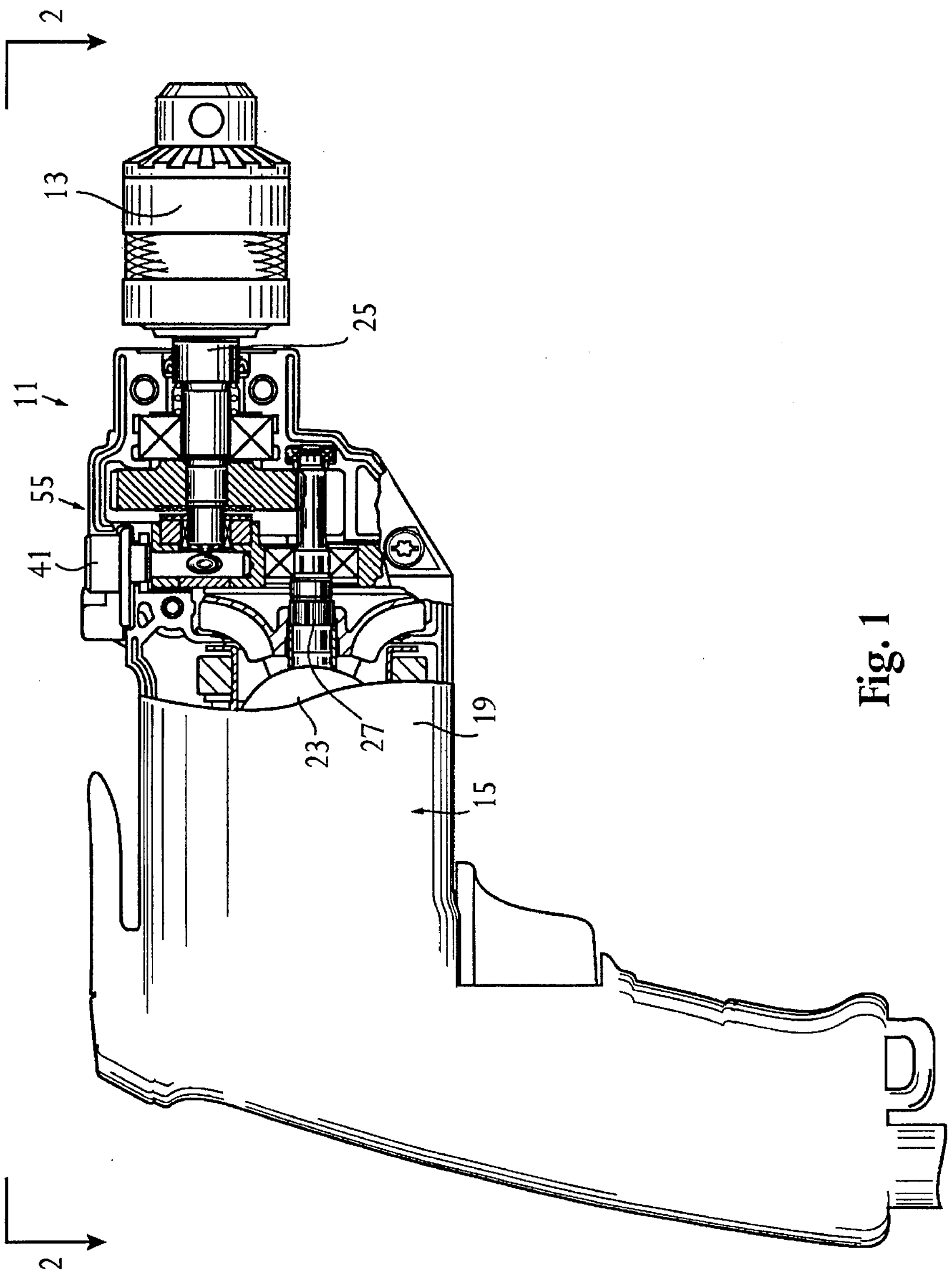
FIG. 1 shows a partially cross-sectioned side elevational view of a hammer drill in accordance with the present invention. The hammer drill is illustrated in the drill mode.
Figure 2:
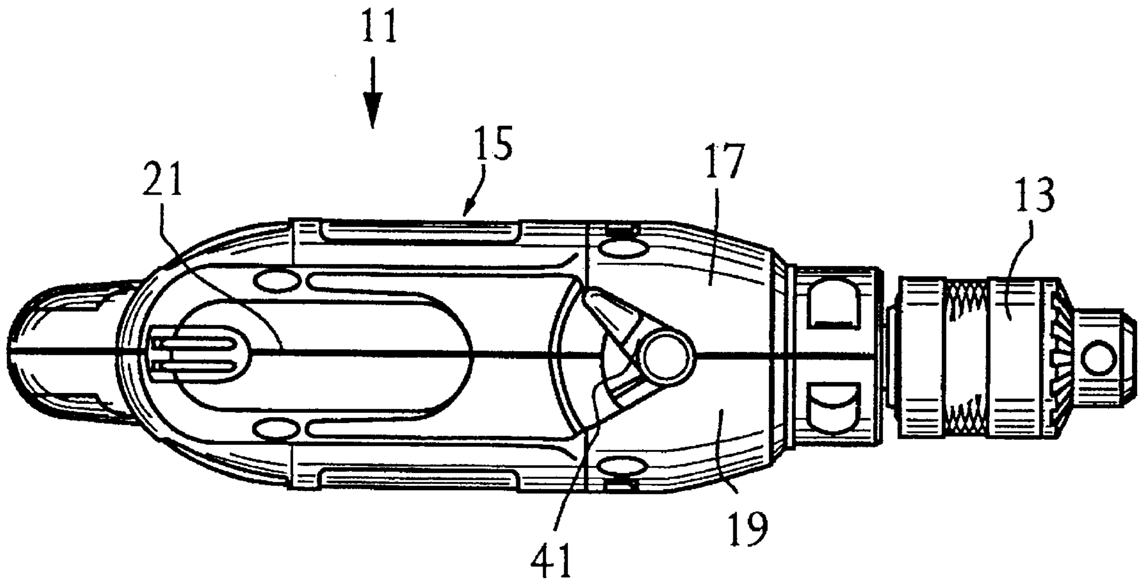
FIG. 2 shows a top plan view taken along line 2—2 of FIG. 1.
Figure 3:
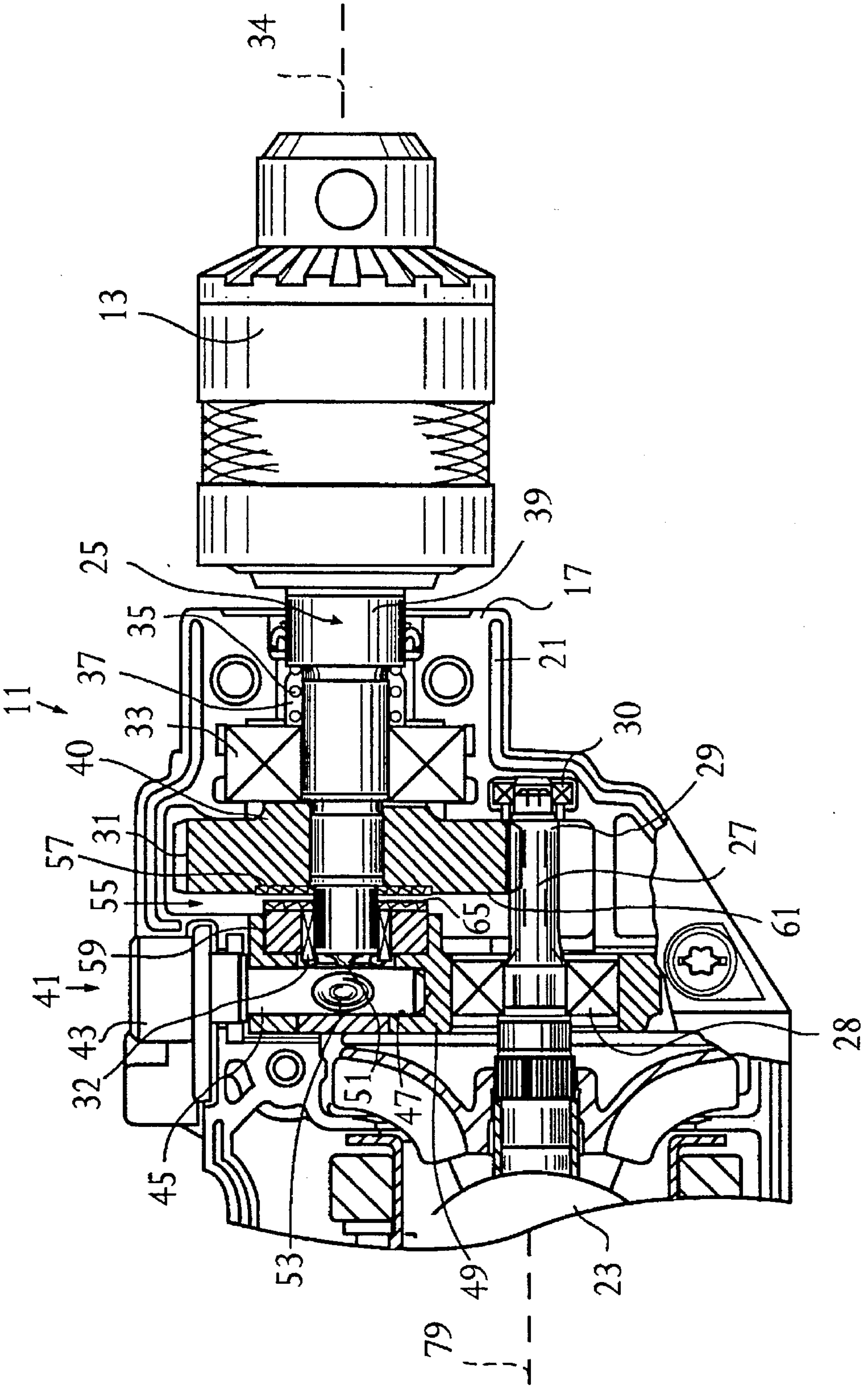
FIG. 3 shows an enlarged, fragmentary axial cross-sectional view of the hammer drill shown in FIG. 1.
Figure 4:
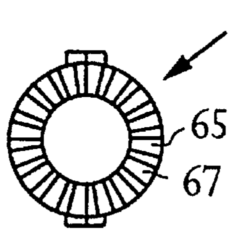
FIG. 4 shows a front elevational view of an input plate of a hammer clutch for the hammer drill shown in FIG. 1.
Figure 5:
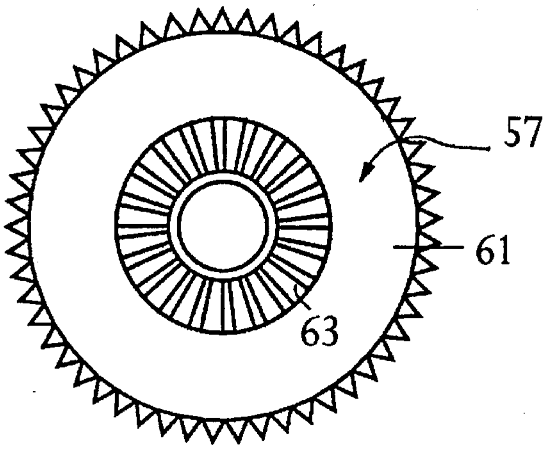
FIG. 5 shows a rear elevational view of an output plate of the hammer clutch.
Figure 6:
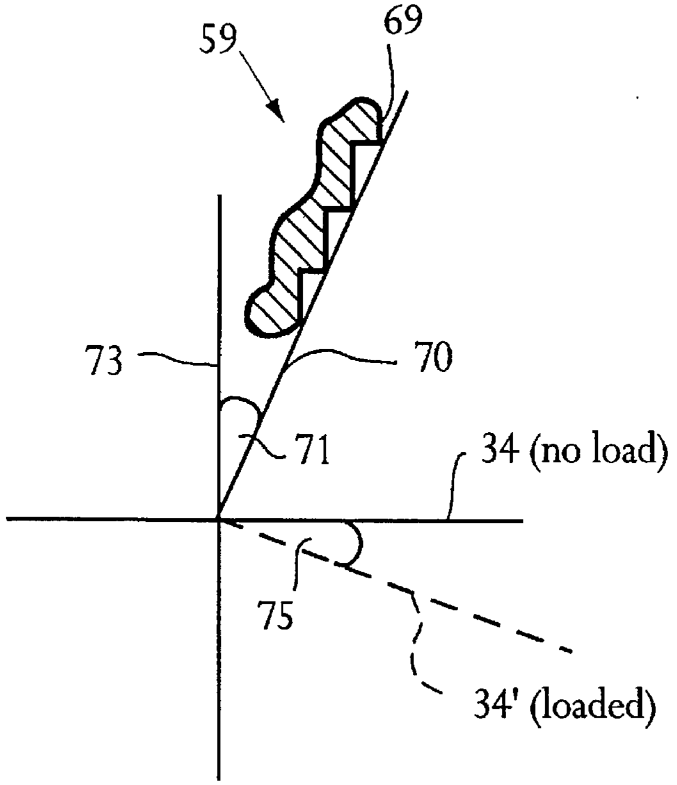
FIG. 6 shows a schematic view illustrating the forward inclination of the input clutch plate of the hammer clutch of the hammer drill shown in FIG. 1.
Figure 7:
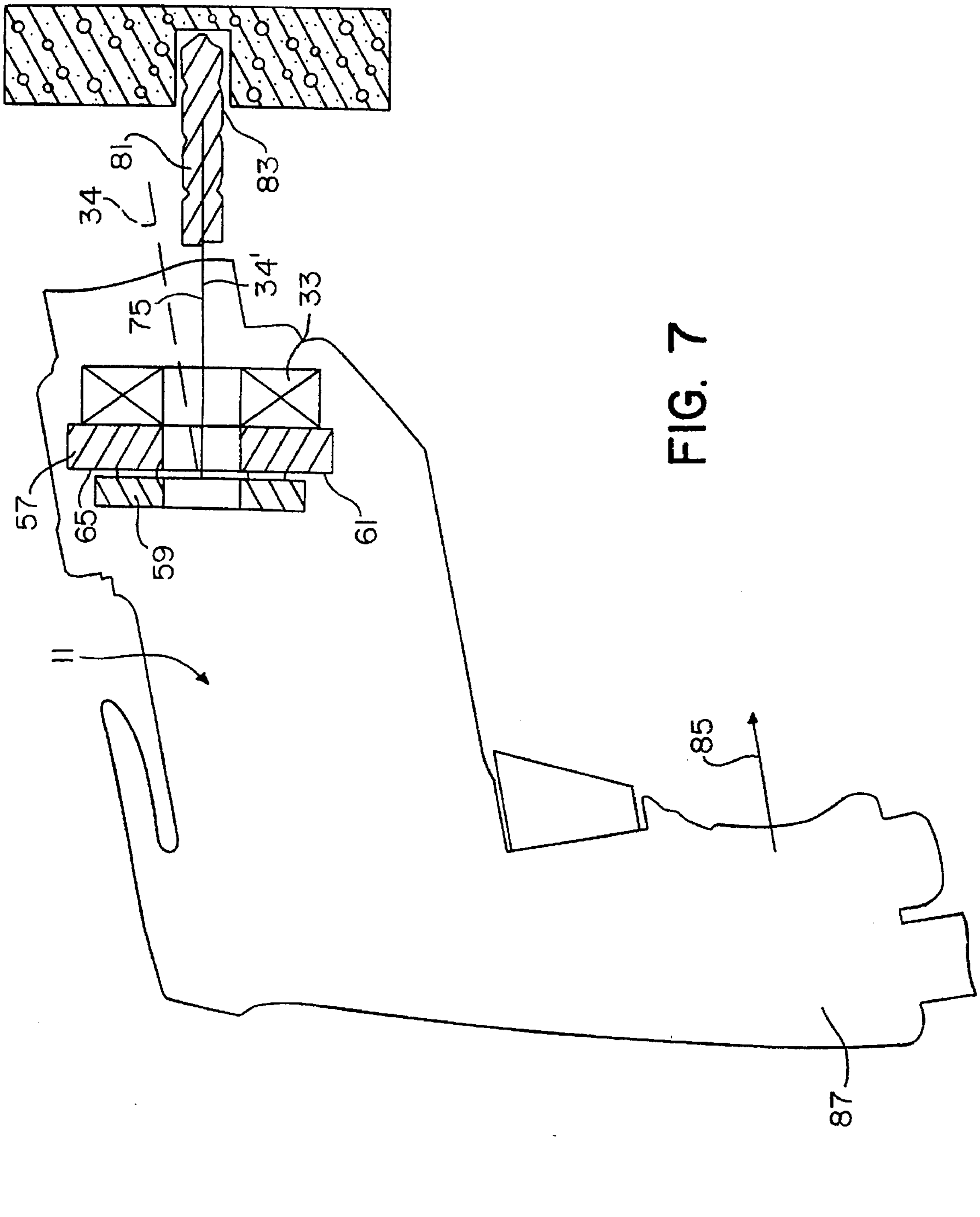
FIG. 7 shows a schematic view of the hammer drill of FIG. 1 illustrating the shifted or load position of the output spindle and output clutch plate in use in the hammer drill mode.

The preferred embodiment of a hammer drill in accordance with the present invention is illustrated in FIGS. 1–3. FIGS. 4 and 5 illustrate details for the preferred embodiment. FIGS. 6 and 7 are schematics to illustrate the operation of the embodiment.

The preferred embodiment is a hammer drill 11 and is operable in two modes of operation, namely, a hammer drill mode and a drill mode. In the hammer drill mode, a bit (not shown) mounted in a chuck 13 is rotatably driven and is axially reciprocated. In the drill mode, the bit is rotatably driven but is not axially reciprocated.

In accordance with the present invention, as shown in FIGS. 1–3, hammer drill 11 comprises a housing 15. Housing 15 is preferably a clam shell housing formed of two clam shell halves 17, 19 joined along an axially extending interface 21. As will be explained further below, other housing types such as a jam pot housing 5 may be used.

According to the present invention, a motor 23 (FIGS. 1, 3) is provided in housing 15 for driving an output spindle 25. Motor 23 is preferably a universal motor but other motor types may be used. Preferably motor 23 has an armature shaft 27 having a spur gear 29 formed at its distal end. For stability, the distal end of shaft 27 is rotatably supported in bearings 28 and limited in deflection by bearing 30. Spur gear 29 drives output shaft 25 through an intermediate spur gear 31 axially and rotatably fixed to output spindle 25.

According to the present invention, output spindle 25 (FIG. 3) is axially slidable and rotatably mounted in housing 15 about a no-load spindle axis 34. Preferably, spindle 25 is rotatably and slidably mounted in a pair of spaced bearings 32, 33. To permit axial movement of spindle 25, spur gear 31 is freely axial slidable relative to spur gear 29.

According to the present invention, hammer drill 11 further comprises a spring 35 for forwardly biasing spindle 25 and gear 31 to the location shown in FIG. 3. Preferably spring 35 is a coil spring located in a housing cavity 37 coaxially of shaft 25. Spring 35 is located between bearing 33 fixed in housing 15 and an enlarged shaft segment 39. Forward travel of shaft 25 in housing 15 is limited by a hub 40 formed on spur gear 31 and engageable with axially fixed bearing 33.

According to the present invention, a mode selector 41 (FIGS. 2, 3) is engageable with spindle 25 for locking spindle 25 against axial movement in the drill mode setting and is disengageable with spindle 25 for permitting spindle 25 to be axially slidable in the hammer mode setting. FIGS. 2, 3 illustrate the drill mode. Mode selector 41 preferably comprises a knob 43 fixed to a cylindrical control shaft 45 rotatably supported in a cavity 47 of bearing block 49. Shaft 45 has a recess 53 for selectively receiving a hemispherical end 51 of spindle 25 when selector 41 is set to the hammer drill mode. As will be explained further below, when recess 53 and spindle end 51 are aligned, spindle 25 may be axially reciprocated and rearwardly biased by an operator during operation in the hammer drill mode. When selector 41 is set to the drill mode, recess 53 and spindle end 51 are misaligned to lock shaft 25 in the forwardly biased position shown in FIG. 3.

According to the present invention, hammer drill 11 further comprises a hammer clutch 55 comprising first (output) and second (input) clutch plates 57, 59. Plate 57 is axially and rotatably fixed to spindle 25 and has a rear face 61 transverse to spindle axis 34 and a first tooth array 63 on rear face 61. Second clutch plate 59 is fixed in housing 15 and has a front face opposed to rear face 61 and has a second tooth array 67 on the front face 65. The second tooth array 67 is engageable with the first tooth array 63 when rearward bias is applied to spindle 25 and mode selector 41 is in the hammer mode setting. Tooth arrays 63, 67 (FIGS. 4, 5) are preferably annular.

According to the present invention, the front face 65 of second plate 59 is forwardly inclined. And, the rear face 61 of first plate 57 is shiftable in use in the hammer drill mode to be generally parallel to front face 65. More specifically, as shown schematically in FIG. 6, the tips 69 of the second tooth array 67 define a plane 70 forming a small positive angle 71 in a rectangular coordinate system formed by no-load spindle axis 34 and a line 73 perpendicular to the spindle axis 34. Preferably angle 71 is between about 0.75 and 1.25 degrees and is optimally about 1°. The magnitude of angle 71 is empirically determined by measuring the angle 75 through which spindle axis 34 and output clutch plate 59 are shifted under load by operator applied bias in the hammer drill mode. As illustrated in FIG. 6, angle 75 is measured between the no-load spindle axis 34 and the loaded spindle axis 34'. Plate 59 is shifted through an equivalent angle (not shown). Preferably, spur gear 31 and output clutch plate 57 are formed in one piece for reduced cost and compactness. Similarly, output shaft 25 and supporting bearing 32 are located coaxially in fixed input clutch plate 59.

In operation, hammer drill 11 may be set for operation either in a hammer drill mode or in a drill mode by mode selector 41. In the hammer drill mode, output spindle 25 is rotatably driven and is axially reciprocated. In the drill mode, spindle 25 is rotatably driven but not axially reciprocated. When selector 41 is set to the hammer drill mode, recess 53 is aligned to selectively receive spindle end 51. When recess 53 and spindle end 51 are aligned, spindle 25 may be axially reciprocated and rearwardly biased by an operator for engagement of clutch plates 57, 59. Rearward bias is applied to spindle 25 when an operator pushes a hammer bit (not shown) against a workpiece to be drilled. As spindle 25 and output clutch plate 57 are rotated relative to fixed input clutch plate 59, rearwardly facing tooth array 63 ratchets over forwardly facing tooth array 67 to provide an axially reciprocating hammer action to output spindle 25. When selector 41 is set to the drill mode, recess 53 and bearing 51 are misaligned and spindle 25 is locked in the position shown in FIGS. 1–3 by the cylindrical surface of shaft 45 to prevent axial movement of spindle 25. In this position (FIGS. 1-3) plates 57, 59 are fixed in a disengaged position regardless of the rearward bias applied to spindle 25 by an operator during operation in the drill mode. In both modes, spindle 25 is rotatably driven through armature shaft 27 and spur gears 29, 31. Spur gear 31 is axially and rotatably fixed to spindle 25. Spur gear 31 is freely axially slidable relative to spur gear 29 to permit clutch 55 to be engaged and disengaged and to permit a continuous drive therebetween as spur gear 31 is axially reciprocated in the hammer drill mode.

As schematically shown in FIG. 7, it has been discovered that when using hammer drill 11, spindle 25, bearing 33 and clutch plate 57 tend to pivot in housing 15 through the small angle 75 measured between the no-load spindle axis 34 and the loaded or displaced spindle axis 34'. The no-load spindle axis 34 is parallel to armature axis 79 (FIG. 3) as is conventional in such tools. Spindle 25 is pivoted because, in use, a hammer bit 81 is held in a workpiece hole 83 while the operator applies a force 85 on tool handle 87 offset from spindle axis 34. Thus, a torque is applied to housing 15 about a fulcrum point in the region of bearing 33 that primarily axially locates spindle 25 in housing 15. In prior art hammer drills, the tilting in use of the output spindle and the second or output clutch plate would cause the rear face of the output clutch plate to be tilted relative to the front face of the first or fixed clutch plate which would remain perpendicular to the unloaded spindle axis. According to the present invention, to compensate for the misalignment (in use)

between the mating faces 61, 65 of plates 57, 59. Front face 65 is forwardly inclined at the same angle as rear face 61 is forwardly inclined under load. As a result, mating faces 61, 65 are parallel in use in the hammer drill mode. Through use of the present invention, the durability of clutch 55 can be significantly increased.

It will be apparent to those skilled in the art that various modifications and variations can be made in a hammer drill in accordance with the present invention without departing from the spirit and scope of the invention. For example, rather than forming front face 65 of plate 59 at an angle relative to the rear face of plate 59, the front and rear faces of plate 59 may be parallel. In this instance, the entire plate 59 would be forwardly inclined at a small angle so that its front face 65 and the rear face 61 of plate 57 would be parallel under load in the hammer drill mode. Also, while the primary utility of the present invention is in a hammer drill with a clam shell housing, the present invention may also find application in hammer drills using a jam pot housing to the extent that tilting of the output spindle axis is encountered under load. Such a construction apparently provides a more secure mounting than in a clam shell housing and, therefore, gives rise to less misalignment of the clutch plates under load. Thus, it is intended that the present invention cover these modifications and variations provided they come within the scope of the appended claims and their equivalents.

I claim:

1. A hammer drill for operation in a hammer mode and in a drill mode comprising:

a housing having a front and a back;

a motor in the housing;

an output spindle extending fore and aft in the housing, rotatably driven by the motor and axially slidably mounted in the housing about a spindle axis to define a no-load axis when the hammer drill is not in use;

a spring for forwardly biasing the spindle;

a mode selector engageable with the spindle for locking the spindle against axial movement in a drill mode setting and disengageable with the spindle for permitting the spindle to be axially slidable in a hammer mode setting;

a first clutch plate fixed to and rotatable with the spindle and having a rear face transverse to the spindle axis and a first tooth array extending outwardly on the rear face and terminating in spaced tips;

the tips of the first tooth array of the first clutch plate being in a plane transverse to the no-load axis when the hammer drill is not in use and when the hammer drill is used in the drill mode;

a second clutch plate fixed in the housing having a front face opposed to the rear face of the first clutch plate and having a second tooth array of teeth extending outwardly on the second clutch front face and terminating in spaced tips;

the tips of the second array of the second clutch plate fixedly mounted in the housing as originally assembled therein and being in a plane forming a small positive angle with respect to the transverse plane; and the tips of the first tooth array of the first clutch plate shiftable from the position in the transverse plane, when the hammer drill is in the hammer mode and a predetermined rearward bias is applied to the spindle, to a position parallel to the tips of the second tooth array.

2. The hammer drill of claim 1 wherein the angle is about 1°.

3. The hammer drill of claim 1 wherein the spindle extends through a central aperture of the second clutch plate.

4. The hammer drill of claim 1 wherein:

the first clutch plate has a periphery;

a first spur gear is formed on the periphery of first clutch plate; and the motor drives a second spur gear engaged with the first spur gear.

5. The hammer drill of claim 1 wherein the second clutch plate has a rear face extending perpendicular to the spindle axis.

6. The hammer drill of claim 1 wherein the housing comprising two clam shell halves joined generally in a plane extending parallel to the spindle axis.

7. The hammer drill of claim 1 wherein in use, the first clutch plate rear face is shiftable such that the tips of the first tooth array are parallel to the plane of the second tooth array.

8. A hammer drill for operation in a hammer mode and in a drill mode comprising:

a housing having a front and a back;

a motor in the housing;

an output spindle extending fore and aft in the housing, rotatably driven by the motor and axially slidably mounted in the housing about a spindle axis;

a spring for forwardly biasing the spindle;

a mode selector engageable with the spindle for locking the spindle against axial movement in a drill mode setting and disengageable with the spindle for permitting the spindle to be axially slidable in a hammer mode setting;

a first clutch plate fixed to and rotatable with the spindle and having a rear face being in a plane transverse to the spindle axis when the hammer drill is not in use and when the hammer drill is used in the drill mode setting and having a first tooth array of teeth on the rear face;

a second clutch plate fixed in the housing having a front face opposed to the rear face of the first clutch plate and having a second tooth array of teeth extending outwardly on the second clutch plate front face;

the front face of the second clutch plate being fixedly mounted in the housing as originally assembled therein and being in a plane which is forwardly inclined with respect to the transverse plane; and the rear face of the first clutch plate being shiftable from the position in the transverse plane, when in use in the hammer mode setting and upon application of a predetermined rearward bias to the spindle, to a position parallel to the forwardly inclined front face of the second clutch plate.

9. The hammer drill of claim 8 wherein the front face of the second clutch plate is inclined at about 1° angle relative to a line perpendicular to the spindle axis.

10. The hammer drill of claim 8 wherein the housing is a clam shell housing.

11. A hammer drill for operating a hammer bit in a rotating and reciprocating motion, comprising:

a housing having a front and a back;

a motor in the housing;

an output spindle extending fore and aft in the housing, rotatably driven by the motor and axially slidably mounted in the housing about a spindle axis to define a no-load axis when the hammer drill in not in use;

a spring for forwardly biasing the spindle;

a first clutch plate fixed to and rotatable with the spindle and having a rear face transverse to the spindle axis and a first tooth array extending outwardly from the rear face and terminating in spaced tips;

the tips of the first tooth array of the first clutch plate being in a plane transverse to the no-load axis when the hammer drill is not in use;

a second clutch plate fixed in the housing having a front face opposed to the rear face of the first clutch plate and having a second tooth array of teeth extending outwardly from the front face of the second clutch plate and terminating in spaced tips;

the tips of the second tooth array of the second clutch plate fixedly mounted in the housing as originally assembled therein and being in a plane forming a small positive angle with respect to the transverse plane; and the tips of the first tooth array of the first clutch plate being shiftable from the position in the transverse plane, when a predetermined rearward bias is applied to the spindle, to a position parallel to the tips of the second tooth array.

* * * * *